(12) United States Patent
DelPico et al.

(10) Patent No.: US 6,791,749 B2
(45) Date of Patent: Sep. 14, 2004

(54) POLARIZED EXPOSURE FOR WEB MANUFACTURE

(76) Inventors: Joseph DelPico, 202 Prospect St., Brockton, MA (US) 02402; Yves G. Conturie, 96 Robinwood Ave., Needham, MA (US) 02492

( * ) Notice: Subject to any disclaimer, the term of this patent is extended or adjusted under 35 U.S.C. 154(b) by 0 days.

(21) Appl. No.: 09/942,312

(22) Filed: Aug. 29, 2001

(65) Prior Publication Data

US 2003/0043461 A1 Mar. 6, 2003

(51) Int. Cl.$^7$ .............................................. G02B 27/28
(52) U.S. Cl. .......................... 359/487; 359/485; 362/19
(58) Field of Search ................................ 349/123, 124, 349/125, 126, 127, 128, 129, 130, 131, 132, 133, 134, 135, 136; 362/19; 359/485, 487, 858

(56) References Cited

U.S. PATENT DOCUMENTS

| | | | |
|---|---|---|---|
| 5,262,882 A | * 11/1993 | Hikmet | 349/127 |
| 5,934,780 A | 8/1999 | Tanaka | 362/19 |
| 5,998,563 A | * 12/1999 | Pirwitz et al. | 528/26 |
| 6,190,016 B1 | 2/2001 | Suzuki et al. | 362/19 |
| 6,206,527 B1 | 3/2001 | Suzuki | 359/858 |
| 6,385,369 B1 | * 5/2002 | Hill et al. | 385/37 |

FOREIGN PATENT DOCUMENTS

| | | |
|---|---|---|
| EP | 0 913 720 A2 | 10/1998 |
| EP | 1 020 739 A2 | 1/2000 |
| GB | 2 343 525 A | 11/1999 |
| WO | WO 99/08148 | 7/1998 |

OTHER PUBLICATIONS

"Wide Viewing Angle Photoaligned Plastic Films For TN–LCDS", J. Chen, K. C. Chang and J. DelPico, Flat Panel Display Development, Polaroid Corporation, Waltham, MA H. Seiberle and M. Schadt, Rolic Research Ltd, 4123 Allschwil, Switzerland.

"Polarized Light Production and Use", William A. Shurcliff, Research Fellow in Physics, Harvard University, Harvard University Press, Cambridge, MA 1962.

"Pile–Of–Plates Polarizers For The Infrared: Improvement In Analysis And Design", George R. Bird and W. A. Shurcliff, Research Division, Polaroid Corporation, Cambridge, MA, (Received Sep. 8, 1958). Journal of the Optical Society of America, vol. 49, No. 3, Mar. 1959.

\* cited by examiner

Primary Examiner—Drew Dunn
Assistant Examiner—Joshua L Pritchett

(57) ABSTRACT

A system is provided in which an expanded non-collimated source of light may be used to produce a uniform polarized light exposure for use, for example, in the photo alignment of optical films. Uniformity of polarization and intensity may be maintained even when a high-intensity source of ultraviolet light is used. The system may be scaled in size to produce large exposures without sacrificing uniformity of intensity of uniformity of direction of polarization. The system includes a light source, a pile-of-plates polarizer, and a surface (such as the surface of an optical film) to be exposed. The pile-of-plates polarizer is oriented orthogonally to the surface, thereby providing a polarized light exposure having a uniform direction of polarization on the exposed surface. The light source may be oriented at Brewster's angle to the polarizer to improve polarization contrast.

29 Claims, 12 Drawing Sheets

POLARIZED EXPOSURE FOR WEB MANUFACTURE

BACKGROUND OF THE INVENTION

1. Field of the Invention

The present invention relates to production of polarized light exposures and, more particularly, to production of high-intensity and high-frequency polarized light exposures having a uniform intensity and uniform direction of polarization, which are useful in the industrial-scale manufacture of photo-aligned optical films.

2. Related Art

One step in the process of manufacturing optical film typically involves the alignment of the molecules in an optical coating on the film. Such alignment may, for example, be performed using a photo-alignment process that involves passing the coated film (referred to herein as a "web") through a device that exposes the coated surface to polarized light. This polarized light exposure aligns the molecules in the optical coating in a direction parallel to the plane of polarization, thereby producing desirable optical qualities in the coated film. Optimal alignment is produced when the polarized light is uniform in both intensity and direction of polarization across the web. Furthermore, because the time required to produce the desired alignment is related to the intensity of the light to which the web is exposed, the web may be prepared more quickly if it is exposed to higher-intensity polarized light.

It is therefore desirable, in the preparation of photo-aligned optical films, to expose such films to a uniformly-intense field of polarized light having a uniform direction of polarization. Furthermore, in certain applications it is desirable for the polarized light to be in the ultraviolet (UV) spectrum.

Previous systems for producing photo-aligned optical films have encountered a variety of problems. For example, although conventional sheet polarizers may be used to produce the polarized light exposure, conventional sheet polarizers are primarily effective in the visible light spectrum. Such polarizers typically do not efficiently polarize light in the UV spectrum; they typically absorb about 70–80% of the UV light to which they are exposed. As a result, such polarizers are not well-suited for polarizing UV light. This problem is further compounded in the case of high-intensity UV light. Because of the large percentage of such light which would be absorbed by a conventional sheet polarizer, such polarizers would overheat and potentially melt and/or combust if exposed to high-intensity UV light over any appreciable amount of time.

Some previous systems have employed a "pile-of-plates" polarizer to produce polarized light for use in photo-alignment systems. Pile-of-plates polarizers are well-known to those of ordinary skill in the art and are described, for example, in *Polarized Light: Production and Use*, William A. Shurcliff, Harvard University Press (1962), pp. 78–85. As its name suggests, a pile-of-plates polarizer employs multiple dielectric plates arranged in a pile. Although the plates in such a polarizer may be arranged in a variety of ways that are well-known to those of ordinary skill in the art, pile-of-plates polarizers generally share the characteristic that an unpolarized beam of light that is incident upon the first plate in the pile is partially polarized by each of the successive plates in the pile, producing a transmitted beam of light that is adequately polarized.

The same principle has been used in some photo-alignment systems to polarize a plurality of rays in a beam of collimated light. Such systems typically generate collimated light (by using, for example, a point source of light and a lens) which is then polarized by a pile-of-plates polarizer. The usefulness of such systems is restricted by the fact that a point source of light must typically be used to produce collimated light. This requirement typically limits the size of the polarized light exposure that may be produced by such systems, thereby limiting the size of the web that may be prepared using such systems. The point source requirement further limits the uniformity of intensity and uniformity of direction of polarization of the resulting polarized light exposure, thereby resulting in limited uniformity of alignment of the molecules in the web's coating.

What is needed, therefore, is a system for producing a large, uniform (in both intensity and direction of polarization), and high-intensity exposure of polarized light. In particular, what is needed is a system that is capable of producing such an exposure of polarized light in the UV spectrum.

SUMMARY

In one aspect of the present invention, a system is provided in which an expanded (i.e., non-point) source of light may be used to produce polarized light having a highly uniform direction of polarization. Such polarized light is of particular use in the industrial-scale manufacture of photo-aligned optical films. For example, a web (a film having an optical coating) may be exposed to the polarized light, thereby aligning the molecules in the coating in a direction parallel to the plane of polarization. Alignment of the molecules in the coating in this manner produces desirable optical properties in the coating, as is well-known to those of ordinary skill in the art.

The polarized light produced by the system may be in the Ultraviolet (UV) spectrum without degrading the performance of the system. Furthermore, the polarized light may have a high intensity without degrading the performance of the system. The exposure may also be uniform in intensity and uniform in direction of polarization across the web. The system may be scaled to produce large exposures without sacrificing uniformity of intensity or uniformity of direction of polarization. As a result, larger webs may be photo-aligned using the system.

The system includes a light source, which may be an extended light source. In other words, the light source need not produce collimated light. The light source may, for example, be a source of high-intensity UV light. The system also includes a pile-of-plates polarizer (made, for example, of transparent uncoated glass). The light source produces light that is oriented at or near Brewster's angle to the pile-of-plates polarizer. The pile-of-plates polarizer polarizes the light from the light source to produce uniformly-polarized light.

The system also includes a film coated with an optical coating. The coated film is referred to herein as a "web." The coating may be made from any material suitable for alignment by exposure to polarized light. For example, such a coating may be made from Linear PhotoPolymerization (LPP) material. The web may, for example, be fed through an electro-mechanical system that passes the web through the field of polarized light produced by the pile-of-plates polarizer. The web is oriented orthogonally to the pile-of-plates polarizer. As a result, the polarized light exposure produced by the pile-of-plates polarizer on the web has a uniform direction of polarization over large areas across the web, even when the light produced by the light source described above is not collimated.

The uniform polarized light exposure on the web causes the molecules in the web's coating to align parallel to the exposure's plane of polarization, thereby producing desirable optical properties in the coating.

Other features and advantages of various aspects and embodiments of the present invention will become apparent from the following description and from the claims.

DETAILED DESCRIPTION

Figure 1A:
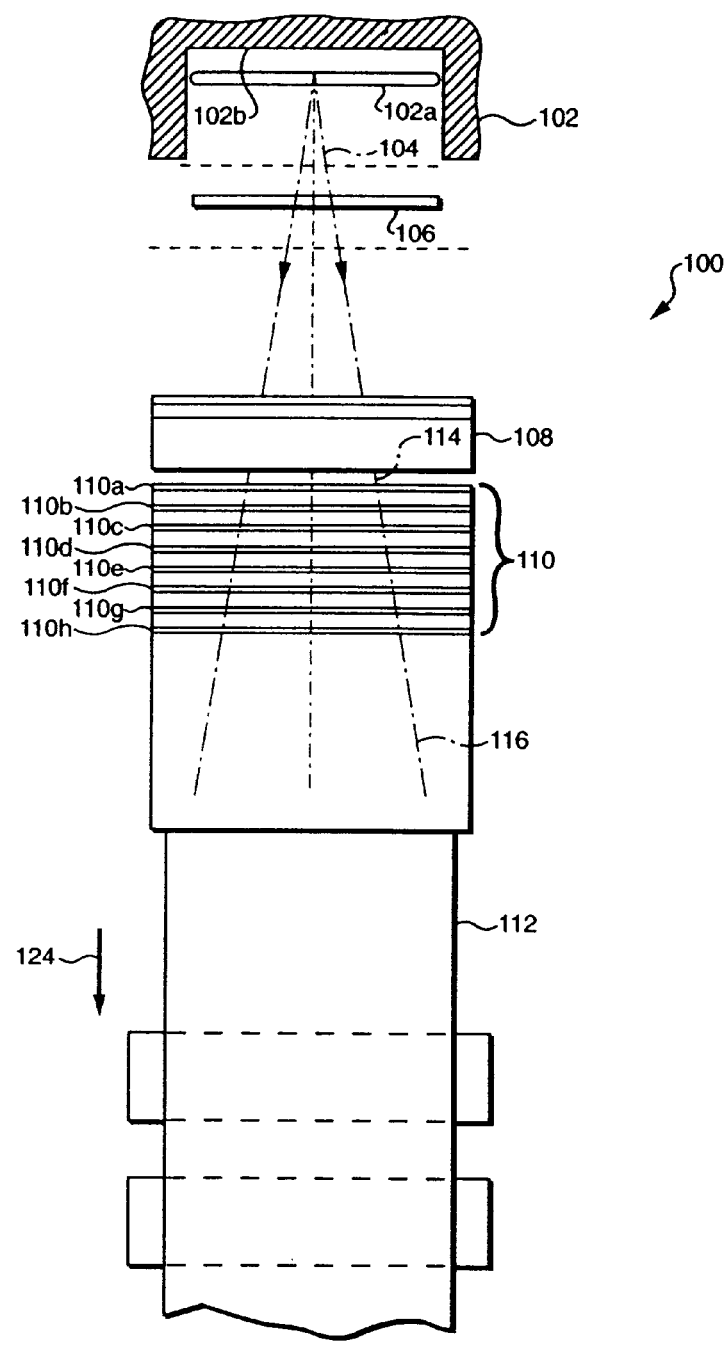
FIG. 1A is a plan view of a photo-alignment system producing a down-web exposure according to one embodiment of the present invention.

In one aspect of the present invention, a system is provided in which an expanded (i.e., non-point source) of light may be used to produce polarized light having a highly uniform direction of polarization. Such polarized light is of particular use in the industrial-scale manufacture of photo-aligned optical films. For example, a web (a film having an optical coating) may be exposed to the polarized light, thereby aligning the molecules in the coating in a direction parallel to the plane of polarization. Alignment of the molecules in the coating in this manner produces desirable optical properties in the coating, as is well-known to those of ordinary skill in the art.

The polarized light produced by the system may be in the Ultraviolet (UV) spectrum without degrading the performance of the system. Furthermore, the polarized light may have a high intensity without degrading the performance of the system. The exposure may also be uniform in intensity and uniform in direction of polarization across the exposure. The system may be scaled to produce large exposures without sacrificing uniformity of intensity or uniformity of direction of polarization. As a result, larger webs may be photo-aligned using the system.

The system includes a light source, which may be an extended light source. For example, in one embodiment of the present invention, the light source is a 10" Xenon Chloride excimer lamp, emitting monochromatic light (e.g., having a wavelength of 308 nm). In other words, the light source need not produce collimated light. The light source may, for example, be a source of high-intensity UV light. The system may also optionally include one or more cylindrical lenses (made of, e.g., quartz or fused silica) to improve the collection of light.

The system also includes a pile-of-plates polarizer. If the light source produces light in the visible spectrum the plates in the pile-of-plates polarizer may, for example, be made of transparent uncoated glass. If high-intensity UV light is to be polarized, the plates should be made of a material suitable for use with high-intensity UV light, such as quartz or fused silica. The light source produces light that is oriented at or near Brewster's angle to the pile-of-plates polarizer. The pile-of-plates polarizer polarizes the light from the light source to produce uniformly-polarized light.

The system also includes a film coated with an optical coating. The coated film is referred to herein as a "web" The coating may be made from any material suitable for alignment by exposure to polarized light (referred to herein as "photo-alignment"). For example, such a coating may be made from Linear PhotoPolymerization (LPP) material. The web may be stationary or, for example, move through the field of polarized light under control of an electromechanical processing system. In such a processing system, the web may be viewed conceptually as an infinite sheet of a predetermined width.

The pile-of-plates polarizer is oriented orthogonally to the web. As a result, the polarized light exposure produced by the pile-of-plates polarizer on the web has a uniform direction of polarization over large areas across the web, even when the light produced by the light source described above is not collimated. Such uniformity of direction of polarization is a critical feature in a roll-to-roll assembly manufacturing process. The system may also optionally include a mechanical mask to make the integrated light intensity uniform across the moving web. The uniform polarized light exposure on the web causes the molecules in the web's coating to align parallel to the exposure's plane of polarization, thereby producing desirable optical properties in the coating.

An extended, non-collimated light source may be used in accordance with various embodiments of the present invention because orienting the pile-of-plates polarizer orthogonally to the web causes the projections of all planes of polarization on the web to be oriented at the same angle within the plane of the web. In other words, orienting the web orthogonally to the pile-of-plates polarizer forces all the rays from the light source, even the skew rays, to be polarized in the same direction at the surface of the web.

Optical designs of photo-alignment systems according to various embodiments of the present invention may generally be subdivided into two types, those designed for: (1) "down-web" exposures in which the azimuth $\xi$ is preferably zero degrees, but in which the system may be modified for oblique exposures having azimuths in the range $0 < \xi \leq 45°$, and (2) "cross-web" exposures in which the azimuth $\xi$ is preferably 90 degrees, but in which the system may be modified for oblique exposures having azimuths in the range $45° \leq \xi \leq 90°$. The design goal in both down-web and cross-web designs is to make a p-polarized exposure (e.g., of high-intensity UV light) across a moving web, with uniform intensity and uniform polarization direction.

Referring to FIG. 1A, a plan view of a photo-alignment system 100 according to one embodiment of the present invention is shown. The system 100 includes a light source 102 that includes a bulb 102a and an elliptical reflector 102b, although it should be appreciated that the light source 102 may be any light source and need not include both a bulb and reflector. The light source 102 emits an unpolarized source light beam 104 which passes through an optional quartz shield 106. The quartz shield 106 is positioned to shield components of the system 100 described below from dirt and debris in the event of a catastrophic failure of the light source 102. Source light beam 104 is gathered by an optional lens 108 to produce collected light beam 114, which is passed to pile-of-plates polarizer 110. Although lens 108 is optional, the collected light beam 114 that it produces has an increased intensity which may be useful in increasing the throughput of the system 100.

As shown in FIG. 1A, the pile-of-plates polarizer 110 includes eight parallel plates for purposes of example. It should be appreciated, however, that any of a variety of pile-of-plates polarizers may be used having various numbers of plates shaped and configured in a variety of ways. The system 100 also includes a web 112, which is an optical film coated with a suitable optical coating. Source light beam 104 is polarized by the pile-of-plates polarizer 110, producing polarized light 116. Polarized light 116 is incident upon web 112, thereby photo-aligning the molecules in the web's coating.

Although the web may be stationary, it may also be mobile. For example, referring to FIG. 1B, a side view of the photo-alignment system 100 is shown. As shown in FIG. 1A, the web passes over rollers 118a–b, which pass the web 112 through the polarized light 114 produced by the polarizer 110. The rollers 118a–b are typically but one part of a larger system for preparing the web. Other elements of such a system are omitted from FIGS. 1A–1B for ease of illustration and explanation.

The photo-alignment system 100 is said to produce a "down-web" polarized light exposure on the web 112, because the p-polarized light 114 is in a plane which contains the direction of motion (indicated by arrow 124) of the web 112 through the system 100. The plates 110a–h in the pile-of-plates polarizer 110 are oriented at a special angle known as Brewster's angle relative to the principal axis 126 of the collected light 114 (or the unpolarized source light beam 104, if lens 108 is omitted).

Brewster's angle may be understood as follows.

Consider a beam of light that is incident upon a glass plate. Such a beam of light may be decomposed into two components having orthogonal polarizations. One of these components is referred to as the "p" component (or "p-polarized light"), while the other is referred to as the "s" component (or "s-polarized light"). If a beam of light is incident on a glass plate of refractive index n at a special angle $i_B$ referred to as "Brewster's angle" ($i_B$=tan$^{-1}$ n), the in-plane polarization (the "p" component) is fully transmitted, but the out-of-plane polarization (the "s" component) is partially reflected.

If the source light beam 104 is a UV light beam, a long-pass UV filter, such as a Schott WG-280 filter, may be added to the pile-of-plates polarizer 110 to prevent any photochemical degradation of the LPP material.

As indicated by right angle 120, the web 112 is oriented orthogonally to the plates 110a–h. The polarized light 116 produces a polarized light exposure 122 on the coated surface of the web 112. As a result of the orthogonal orientation of the web 112 to the plates 110a–h, the polarized light exposure 122 has a uniform direction of polarization. As described in more detail below, it should be appreciated that this uniformity of direction of polarization may be achieved even when the source light beam 104 is not collimated.

For exposures in the azimuth ξ=0, the plates 110a–h and the web 112 remain parallel to the axis of the light source 102 and to the axis of the lens 108. Furthermore, they may be set as close to each other and to lens 108 as possible, to minimize the divergence of the polarized beam 116 in the transverse direction, which includes no collimating optics.

For exposures at other azimuths, all the optics (e.g., the light source 102, the shield 106, the lens 108, and the plates 110a–h) may be rotated with respect to the web 112. The footprint of the polarized beam 116, shaped linearly, intersects the web 112 at an angle, rather than straight across. If the azimuth approaches ξ=90°, that footprint runs nearly parallel to the direction of travel 124, no longer covers the whole width of the web 112, and may produce a streaky exposure. This is why the system 100 shown in FIGS. 1A–1B is preferably used only for azimuths up to ξ≈45°, although the particular useful limit may vary from implementation to implementation.

Figure 1B:
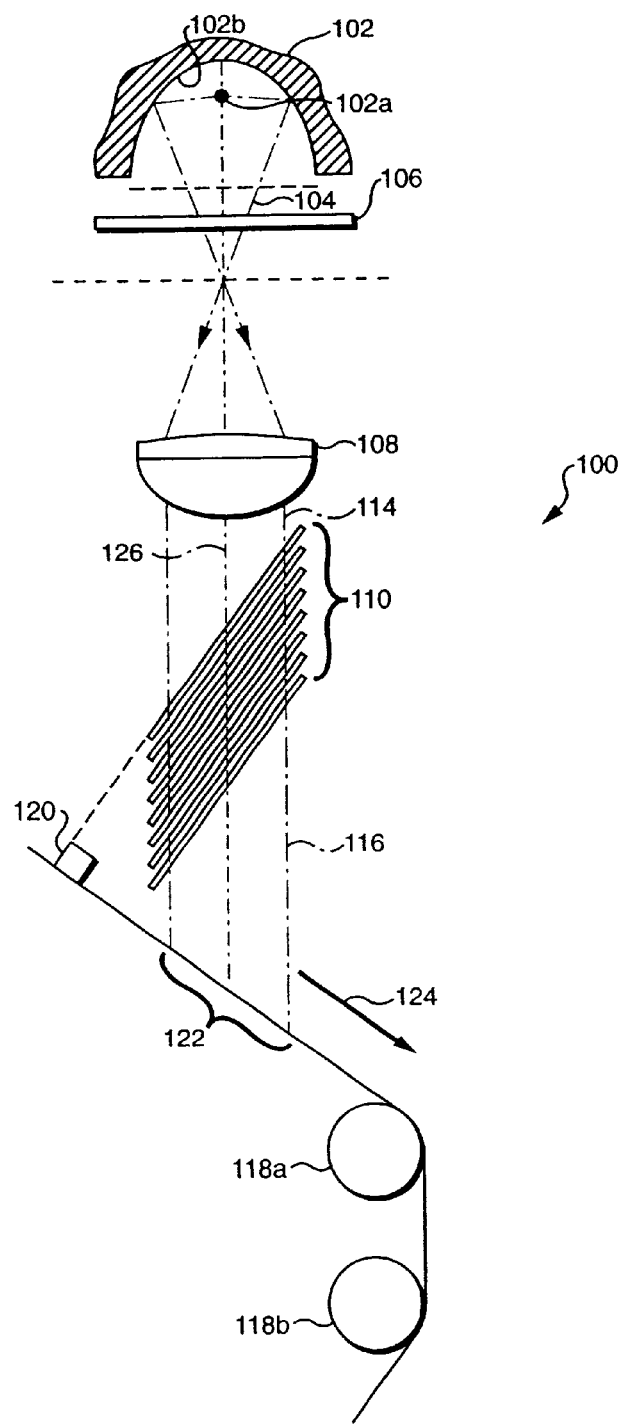
FIG. 1B is a side view of the photo-alignment system of FIG. 1A.
Figure 2:
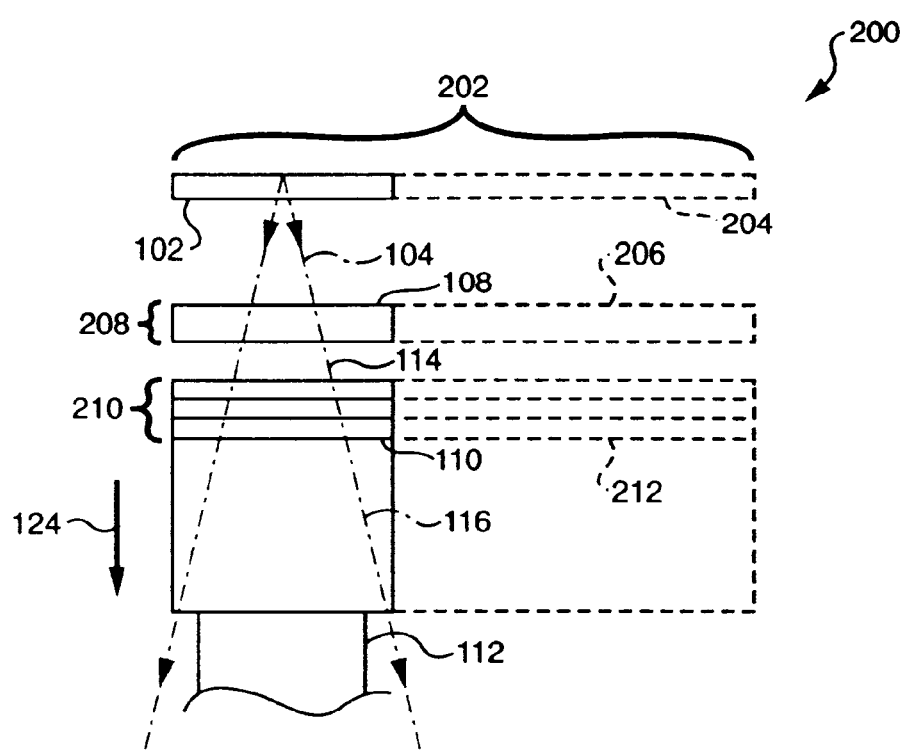
FIG. 2 is a plan view of a scaled-up down-web photo-alignment system according to one embodiment of the present invention.

The size of the system 100 shown in FIGS. 1A–1B may be scaled up to produce a larger polarized light exposure for exposing larger webs. For example, a scaled-up photo-alignment system 200 is shown in FIG. 2. The system 200 is the same as the system 100, except that the light source 102, lens 108, and pile-of-plates polarizer 110 have been extended in one dimension. More specifically, the system 200 includes an extended light source 202, which is as wide as the original light source 102 plus an extension 204. Although both the original light source 102 (shown in solid outline) and the extension 204 (shown in dashed outline) are shown in FIG. 2 for purposes of illustrating the extended width of the light source 202, it should be appreciated that the light source 202 may be a single extended light source having the combined widths of the original light source 102 and the extension 204. The extended light source 202 may also, however, be composed of multiple light sources, such as by lining up multiple ones of the light source 102 end-to-end.

As shown in FIG. 2, the system 200 also includes an extended cylindrical lens 208, which is as wide as the original lens 108 plus an extension 206. It should be appreciated that although the original lens 108 and the extension 206 are shown in FIG. 2 for ease of illustration, the extended lens 208 is actually a single lens having the combined width of the original lens 108 and the extension 206. The extended lens 208 may have the same width and the same radii of curvature as the original lens 108.

Similarly, the system 200 includes an extended pile-of-plates polarizer 210, which is as wide as the original pile-of-plates polarizer plus an extension 212. It should be appreciated that although the original pile-of-plates polarizer 110 and the extension 212 are shown in FIG. 2 for ease of illustration, the extended pile-of-plates polarizer 210 is actually a single pile-of-plates polarizer having the combined width of the original polarizer 110 and the extension 212. The width and thickness of the plates in the extended polarizer 210 may be the same as that of the plates 110a–h in the original polarizer 110.

The scaled-up system 200 may be used to produce a uniform exposure of polarized light on the web 112 in the same manner as the original system 100 shown in FIG. 1.

The original system 100 may be scaled up or down by any scaling factor to produce a system of a different size, such as the system 200 shown in FIG. 2. The uniformity in the direction of polarization across the web 112 (not shown in FIG. 2) may actually be improved by use of the scaled-up system 200, because such a system exposes only the edges of the web 112 to strongly off-axis cones of polarized light.

Figure 3A:
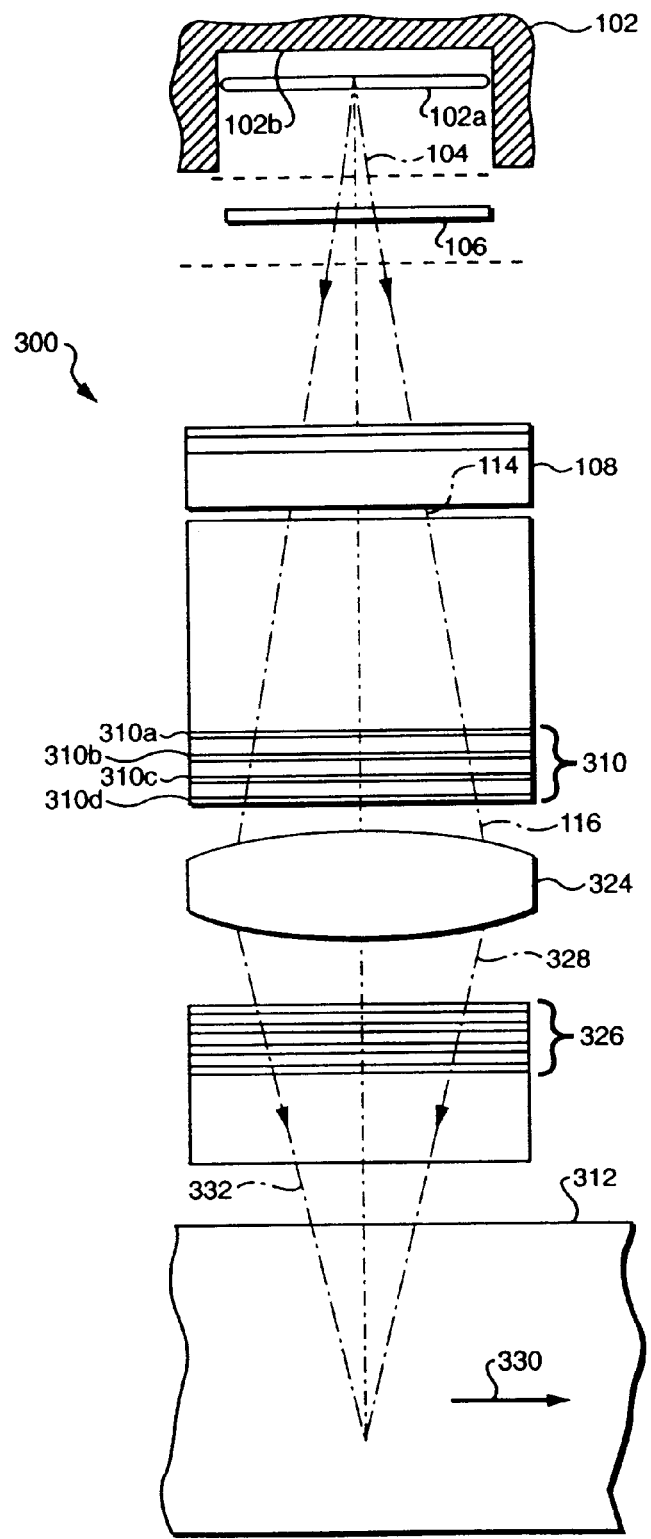
FIG. 3A is a plan view of a photo-alignment system producing a cross-web exposure according to one embodiment of the present invention.

Referring to FIG. 3A, a plan view of a photo-alignment system 300 for photo-aligning an optical coating on a web 312 according to another embodiment of the present invention is shown. The system 300 is shown in side view in FIG. 3B. The photo-alignment system 300 is said to produce a "cross-web" polarized light exposure on the web 312, because the p-polarized light 332 produced by the system 300 is in a plane orthogonal to the direction of motion 330 of the web 312 through the system 300.

The system 300 includes the light source 102, quartz shield 106, and cylindrical lens 108 described above with respect to FIGS. 1A–1B. Instead of the eight-plate polarizer 110 shown in FIG. 1A, the system 300 includes a four-plate polarizer 310. It should be appreciated, however, that any pile-of-plates polarizer may be used in conjunction with the system 300. The system 300 also optionally includes another cylindrical lens 324, and an additional four-plate pile-of-plates polarizer 326 (making the first pile-of-plates polarizer 310 optional). Lens 324 is used to concentrate the polarized light 116 in the X-Z plane (producing concentrated light 328), parallel to the length of the light source 102, and to produce a uniform intensity of exposure on the web 312. "Uniform intensity" here refers to the distribution of light across the web 312, integrated in the direction 330 of the web's travel.

The second pile-of-plates polarizer 326 polarizes the concentrated light 328, producing polarized light 332. The web 312, as before, is orthogonal to the last set of plates in the second pile-of-plates polarizer 326 (as indicated by right angle 320), to ensure that the direction of polarization remains the same across the web 312. The web 312 itself runs in the transverse direction indicated by arrow 330, i.e., its travel direction is along X, parallel to the length of the light source 102. Note that in FIG. 3B, arrow 330 is drawn as a solid circle within a circle, indicating that the arrow 330 points out of the page, i.e., in a direction orthogonal to the plane of FIG. 3B.

Figure 3B:
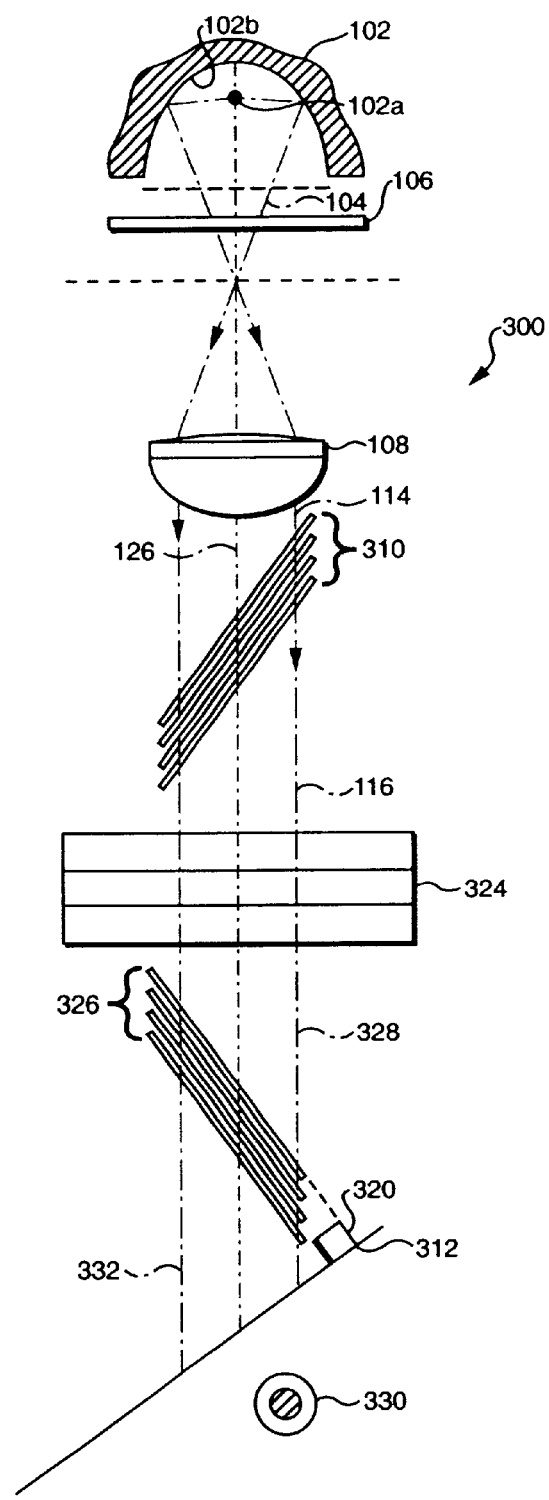
FIG. 3B is a side view of the photo-alignment system of FIG. 3A.

The system 300 shown in FIGS. 3A–3B is preferred for p-polarized exposures in the azimuth $\xi 90°$. For exposures at other azimuths, all the optics in the system 300 (e.g., the light source 102, shield 106, lens 108, polarizer 310, lens 324, and polarizer 326) are rotated with respect to the web 312. As in the previous system 100, the range of azimuths may be limited in particular embodiments of the system 300 by the need to avoid streaky exposures on the web 312. This is why the system 300 is preferably used only for azimuths in the range $45° \leq \xi \leq 90°$, although the particular useful limit may vary from implementation to implementation.

Figure 4A:
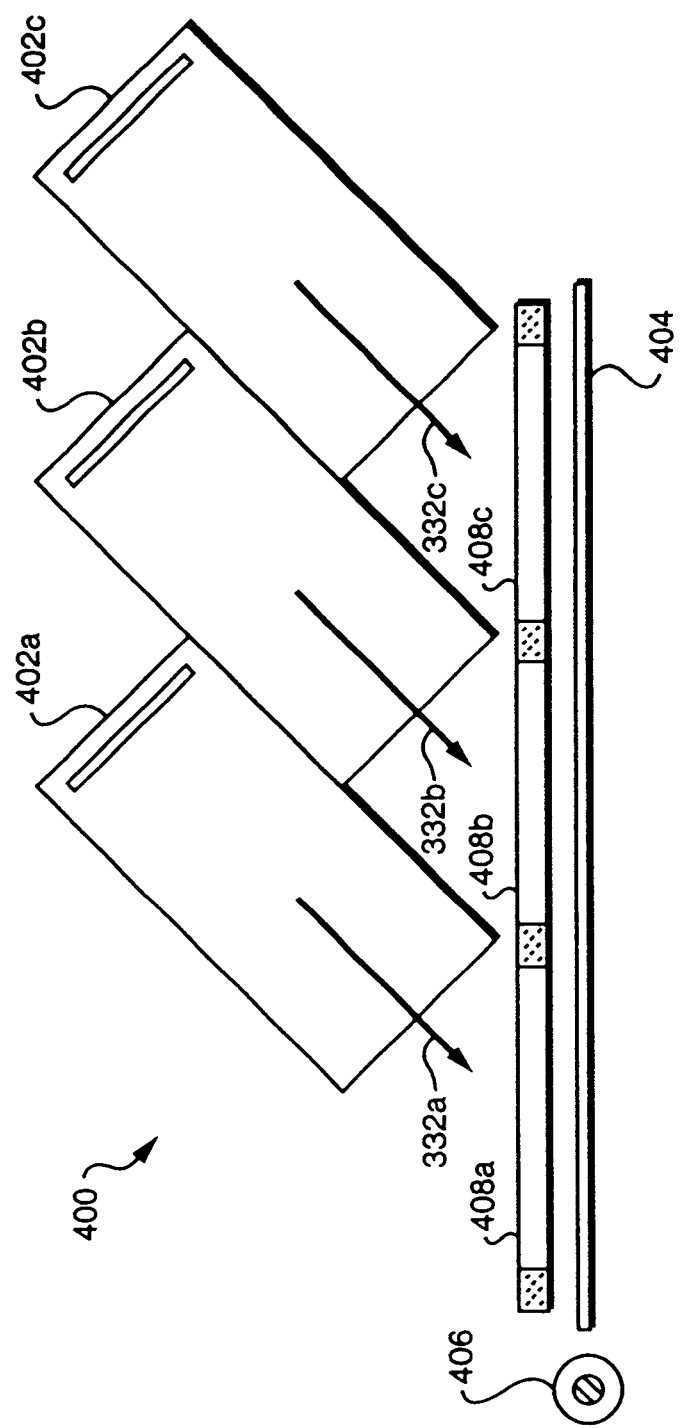
FIG. 4A is a side view of a scaled-up cross-web photo-alignment system according to one embodiment of the present invention.
Figure 4B:
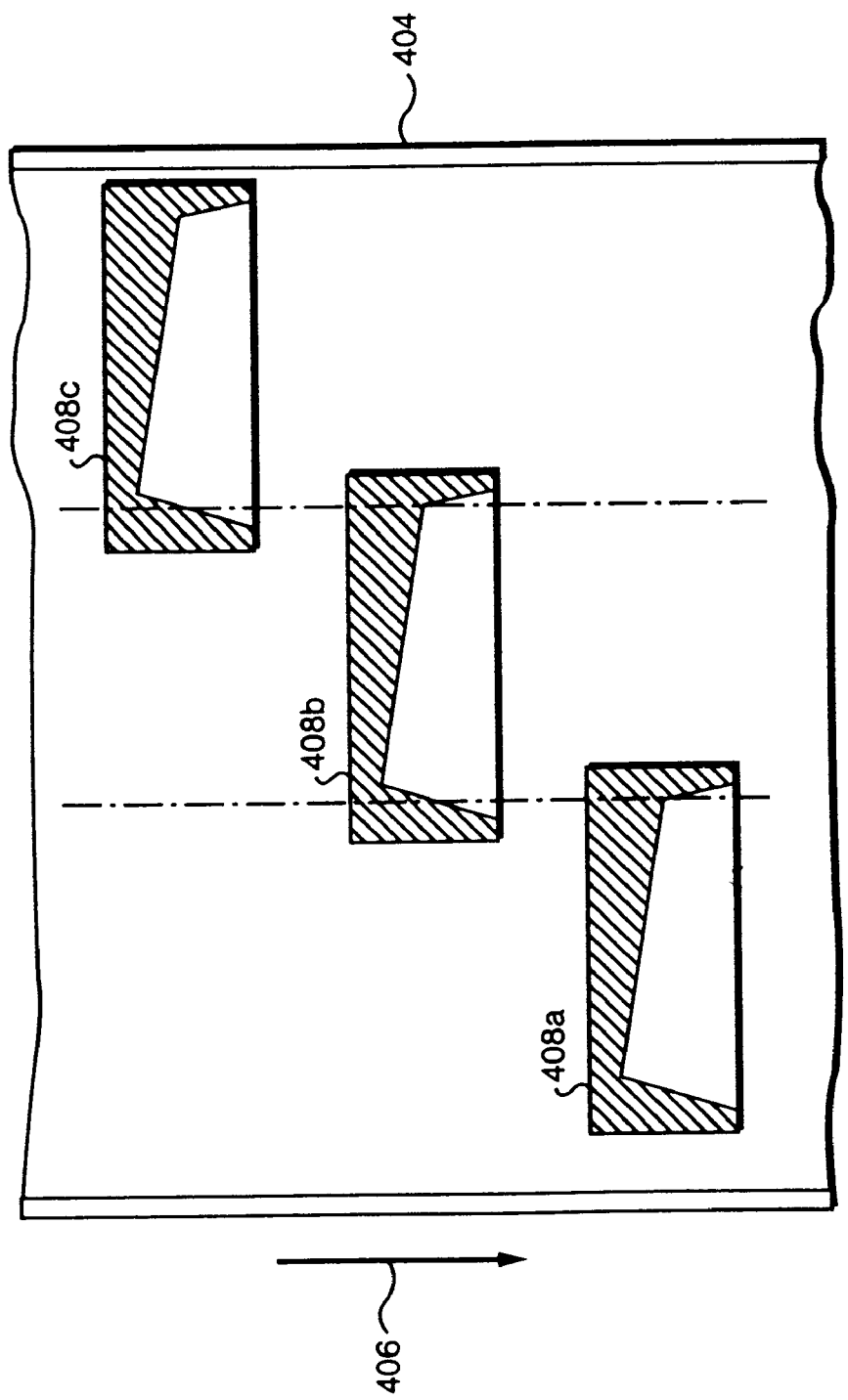
FIG. 4B is a plan view of the photo-alignment system of FIG. 4A.

As with the system 100, the system 300 may also be scaled up to expose a wider web. For example, referring to FIG. 4A, a side view of a system 400 is shown that is a scaled-up version of the system 300 shown in FIGS. 3A–3B. The system 400 includes optics enclosures 402a–c, each of which includes optics such as light source 102, shield 106, lens 108, polarizer 310, lens 324, and polarizer 326. The optics enclosures 402a–c emit polarized beams 332a–c, each of which corresponds to polarized beam 332 in FIGS. 3A–3B. The optics 402a–c, instead of being collated end-to-end as in the scaled-up down-web exposure system 200 (FIG. 2), are now arranged in stacks. The optics enclosures 402a–c are set one above another, in a plane parallel to that of web 404, which moves in a direction indicated by arrow 406. The optics enclosures 402a–c are staggered to keep the same source-to-web distance along their respective axes. Referring to FIG. 4B, a plan view of the system 400 is shown. As shown in FIG. 4B, to simplify the engineering the masks 408a–c may also be placed at separate locations in the down-web direction 406 to create a seamless transition between exposed regions on the web 404.

The light source 102 itself, and especially the elliptical reflector 102b, need not be uniform. The reflector 102b may have one or more openings for air cooling and for the stem of the start-up electrode. In setting up lenses 324 and 108, one should avoid forming on the web 312 any image of these features that would result in a streak. Mapping out the distribution of light could be done analytically, using software such as TracePro® from Lambda Research Corporation of Littleton, Mass. It could also be done experimentally, using the light source 102 itself and a scanning detector, if safety precautions are taken to deal with the intense UV light. It is, however, much easier, at least initially, to perform the optical alignment and visual inspection with a substitute low-intensity light source, such as a low-intensity fluorescent lamp.

The optional long-pass UV filter mentioned above may be inserted into any of the sets of polarizer plates. To protect the filter from absorbing too much short-UV light, it is best to put it at the end of the last set of polarizer plates (i.e., the set of polarizer plates closest to the web 112).

Exposure non-uniformities, either in a single-lamp system (such as the system 100 shown in FIGS. 1A–1B) or in a scaled-up system (such as the system 200 shown in FIG. 2), may be corrected by inserting a tailored mask above the web. For example, as shown in FIG. 4A, masks 408a–c are inserted between the web 404 and each of the optics enclosures 402a–c, respectively. The one-dimensional masks 408a–c limit the length of exposure of the traveling web 404, in proportion to the integrated light intensity measured at each position across the web 404. Each of the masks 408a–c is set at one edge of the corresponding one of the exposing beams 332a–c, to avoid any light loss in the areas of lower intensity. In other words, the support of each of the masks 408a–c is outside the corresponding one of the beams 332a–c, and does not act as an aperture.

It has been stated elsewhere herein that uniform polarization of the exposure 122 on the web 112 may be assured by orienting the web 112 orthogonally to the last set of plates in the pile-of-plates polarizer 110. Justification for this statement is now provided in more detail.

Figure 7:
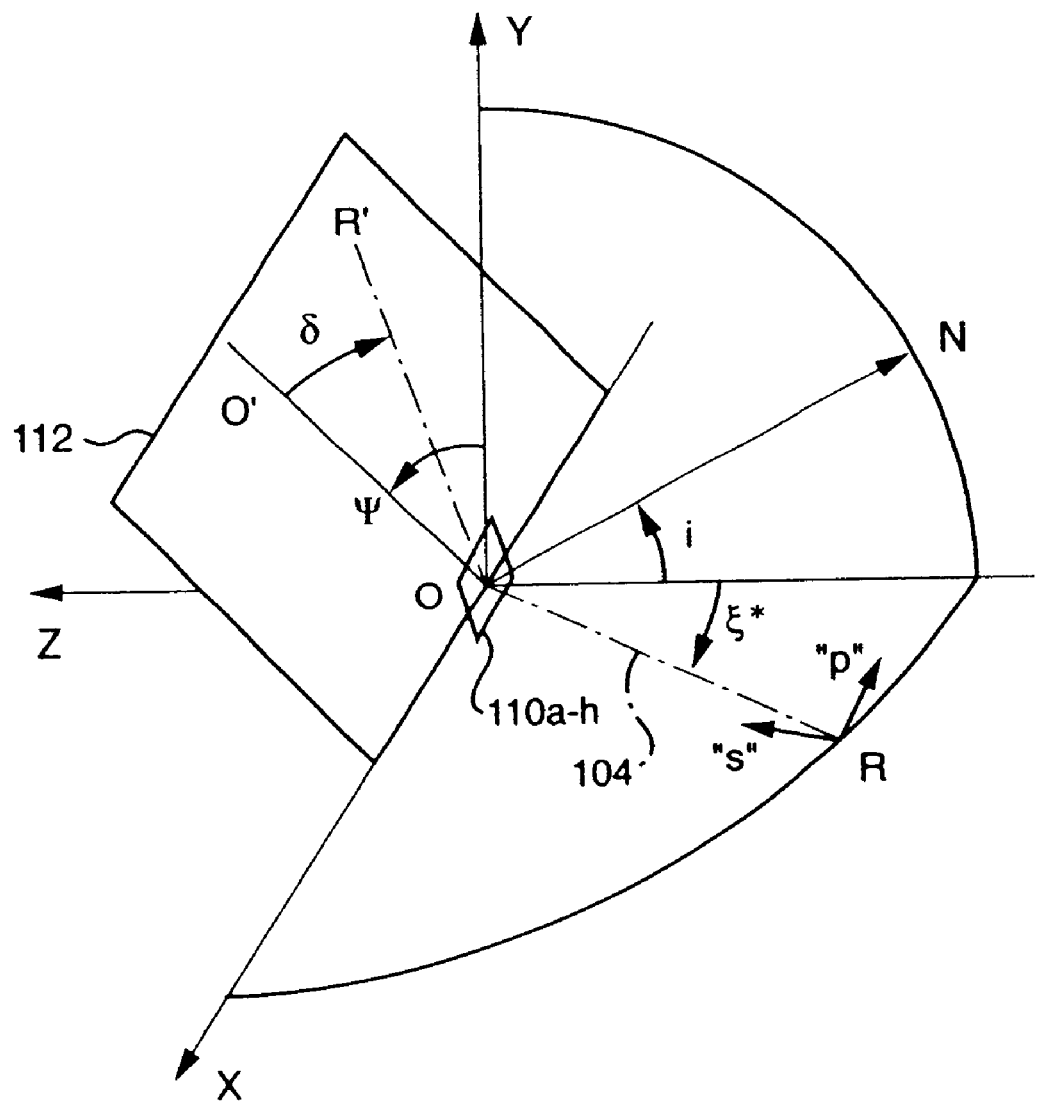
FIG. 7 is a diagram illustrating geometrical relationships among elements in various embodiments of photo-alignment system s according to the present invention.

When a pile-of-plates polarizer, such as the pile-of-plates polarizer 110, is used in combination with an extended light source, such as the light source 102, one must consider the propagation not only of rays along the axis 126 of the optical system 100, but also of skew rays. The relevant geometry is illustrated in FIG. 7. As shown in FIG. 7, Y-Z is the plane of symmetry of the system 100 (axis of symmetry 126 passes through the Y-Z plane). Source light beam 104 is incident from the right side of FIG. 7, along the direction indicated by the line OR. X-Z is defined as the plane orthogonal to Y-Z, containing OR. The polarizing glass plates 110a–h (illustrated as a single parallelogram in FIG. 7 for ease of illustration), rotating around axis OX, are set at an angle i from the X-Y plane. The web 112 itself is set at an angle $\psi$ from the X-Y plane.

For any ray in beam 104, the plane of incidence (and of emergence) on the glass plates 110a–h is defined by the direction of the incident light and by the normal (indicated by ON) to the plates 110a–h. That plane is also the plane of polarization. It sets the "p" and "s" orientations, which are the eigen-states of propagation through the plates 110a–h. For rays parallel to the Y-Z plane (azimuth $\xi^*=0$), the plane of polarization intersects the web 112 along a line parallel to the line indicated by OO'. For skew rays like OR (azimuth $\xi^*\neq 0$), the plane of polarization (OR, ON) intersects the web 112 along OR', which makes an angle $\delta$ with OO'. It is important to minimize $\delta$ in order to avoid changes in the direction of polarization across the web 112, especially near the edges, where skew rays coming from the light source 102 are no longer symmetrical and do not compensate for each other.

The azimuthal plane (OR, OY) may be defined as shown in Equation 1:

$$x/\tan \xi^* + z = 0 \qquad \text{Equation 1}$$

The plane of polarization (OR, ON) may be defined as shown in Equation 2

$$x/\tan \xi^* + y/\tan i + z = 0 \qquad \text{Equation 2}$$

The plane of the web 112 may be defined as shown in Equation 3:

$$y - z/\tan \psi = 0 \qquad \text{Equation 3}$$

The plane of polarization is not coincident with the azimuthal plane. Rather, the plane of polarization makes an angle $\gamma$ with the azimuthal plane, such that:

$$\cos \gamma = \vec{V}_1 \cdot \vec{V}_2 / |\vec{V}_1| \cdot |\vec{V}_2|, \qquad \text{Equation 4}$$

with $\vec{V}_1(1/\tan \xi^*, 0, 1)$ and $\vec{V}_2(1/\tan \xi^*, 1/\tan i, 1)$. $\vec{V}_1$ and $\vec{V}_2$ are the normals to the planes (OR, OY) and (OR, ON), respectively.

After a straightforward calculation, $$\tan \gamma = \sin \xi^* / \tan i \qquad \text{Equation 5}$$

On the web 112, the plane of polarization (OR, ON) makes an angle $\delta$ with the plane of symmetry Y-Z, such that:

$$\cos \delta = \vec{OO'} \cdot \vec{OR'} / |\vec{OO'}| \cdot |\vec{OR'}|, \qquad \text{Equation 6}$$

with $\vec{OO'}(0, 1, \tan \psi)$ and $\vec{OR'}(-\tan \xi^* \cdot [\tan \psi + 1/\tan i], 1, \tan \psi)$. $\vec{OO'}$ and $\vec{OR'}$ are the intersections of the plane of the web 112 with the planes Y-Z and (OR, ON), respectively. After a similar calculation, $$\tan \delta = [\tan \psi + (1/\tan i)] \cdot [\tan \xi^* / \cos \psi] \qquad \text{Equation 7}$$

Angle $\delta$ describes, for skew rays, the angular displacement of the direction of the p-polarization on the web 112, relative to its paraxial direction. The optimal design is such that $\delta=0$, which occurs when $\psi=i-\pi/2$. In other words, the web 112 is preferably set orthogonal to the plane of the glass plates 110a–h. This solution has a simple geometrical explanation: when ON, the normal to the plates 110a–h, is parallel to the web 112, the plane of polarization of any skew ray intersects the web 112 along a line parallel to ON.

If the web 112 and the last set of plates 110a–h are orthogonal and share the same plane of symmetry Y-Z, the condition $\delta=0$ is satisfied for all values of i and $\xi^*$, i.e., it is satisfied for all skew rays.

If the web 112 and the last set of plates 110a–h are not orthogonal, the angular displacement $\delta$ is different for each skew ray, because $\delta$ is a function of both angular coordinates, i and $\xi^*$. The average direction of the plane of polarization on the web 112 may still be fairly uniform from one edge to the other, depending on the geometry of the light source 102, if the skew rays compensate for each other.

The tilt of the plates 110a–h on the axis 126 of the system 100, $i_o$, is a free parameter. It can be selected as $i_o = i_B$ (Brewster's angle, such that $\tan i_B = n$), to optimize the polarization contrast. Then, the tilt of the web 112 on the optical axis is $\psi_o = i_B - \pi/2$. It can also be selected as $i_o < i_B$, to increase the working height of the plates 110a–h (which usually play the role of aperture in the system 100), or as $i_o > i_B$, to reduce the angle of incidence $|\psi_o|$ on the web 112.

In transmission, a slight adjustment of the web angle ($\psi$) may be needed, i.e., the optimal value of $\delta$ may not be zero. This is because, for a skew ray, there is a difference between the plane of polarization (defined as the plane of incidence on the plates 110a–h) and the plane of incidence on the web 112 itself (defined by the direction of the ray and the normal to the web 112). As a result, the "p" and "s" polarizations defined by the (OR, ON) plane are not incident on the web 112 as truly "p" and "s" light. This is, on average, a second order correction, because skew rays coming from different directions compensate for each other. The angle $\psi$ which leads to the most uniform direction of polarization across the web 112 may be established experimentally, starting from the $\delta=0$ geometry. Optical design programs are also available, such as the TracePro® software mentioned above, which can handle extended sources and custom opto-mechanical layouts.

In reflection, the same equations and same angular conditions apply, but the geometry is more complicated. This is because the "s" polarized light reflected by the plates 110a–h must be turned into a "p" polarized light, for cross-web exposure of the LPP coating. The web 112, initially sharing the plane of symmetry Y-Z with the plates 110a–h, must now be tilted ($\psi\star$) in the transverse direction, around an axis parallel to ON, to achieve the desired geometry. That tilt produces another angular displacement, $\delta\star$, of the direction of polarization on the web 112. The angle $\delta\star$ is minimized if the original inclination ($\psi$) of the web 112 on the optical axis is small, i.e. if the inclination of the plates 110a–h is high: $i_o > i_B$. At that angle, though, an efficient multi-plate reflector becomes hard to design.

Among the advantages of the invention are one or more of the following.

As described above, conventional photo-alignment systems typically require that collimated light be provided to a polarizer to be polarized. The requirement that collimated light be used has a variety of disadvantages that are described above. In contrast, photo-alignment systems designed according to various embodiments of the present invention may use a non-collimated (extended) light source to produce a polarized light exposure having a highly-uniform direction of polarization.

Because photo-alignment systems designed according to various embodiments of the present invention are not limited to using point sources of light or collimated light, the size of the polarized light exposure that is produced is not limited by the properties of such light sources. As a result of the ability to use one or more extended light sources, various embodiments of the present invention may be used to produce polarized light exposures that are limited in size only by the size of such light sources and the intensity of light they may produce. The larger polarized light exposures thereby made possible may be used to photo-align larger webs or to prepare webs more quickly than with conventional photo-alignment systems.

Furthermore, previous systems typically relied on the accuracy of collimation of the light source to produce a polarized light exposure having a high degree of uniformity of direction of polarization. Embodiments of the present invention, in contrast, do not have this reliance on collimation accuracy, because they do not rely on the light source being collimated at all. Rather, various embodiments of the present invention may be used to produce light of uniform polarization even from light that is not collimated.

Using the techniques described above, polarized light having a direction of polarization that has a high degree of uniformity across the web may be produced. Such a uniform polarization is important to achieve uniform alignment of the web's coating, and is particularly important if the web is to be used in a roll-to-roll lamination process to make components for LCDs. The techniques described herein may be used to achieve such uniformity of polarization even with an extended, high-frequency, high-intensity light source producing many skew rays. Such uniformity of polarization increases the overall quality of the prepared film for use in a variety of applications. Such techniques may, of course, also be used with low-intensity light, low-frequency light (such as visible light or infra-red light), collimated light, or any combination thereof.

As described above, it is desirable in a variety of applications, such as those involving photo-alignment, to produce polarized light in the UV spectrum. As further described above, the performance of conventional sheet polarizers degrades rapidly as the wavelength of the light to be polarized decreases. As a result, conventional sheet polarizers polarize UV light very inefficiently. In contrast, the pile-of-plates polarizer used by various embodiments of the present invention polarizes UV light efficiently. Because photo-alignment systems provided according to various embodiments of the present invention are capable of providing a polarized exposure of such UV light having a uniform direction of polarization across the exposure, such embodiments may be used in photo-alignment applications requiring or benefiting from the use of UV light. Such embodiments thereby provide a significant advantage over conventional photo-alignment systems.

As further described above, it is desirable in a variety of applications, such as those involving photo-alignment, to produce polarized light having a high intensity. Conventional sheet polarizers are typically not well-suited for use with such high-intensity light due to their inefficiency of polarization. This is particularly true with respect to polarization of high-intensity UV light. In contrast, various embodiments of the present invention may advantageously be used to polarize high-intensity light—even high intensity UV light—to produce a high-intensity polarized light exposure having a uniform direction of polarization.

In many applications, the coating on the web must be exposed to polarized light having a high amount of energy per unit area in order to be properly aligned. The low efficiency and other characteristics of conventional sheet polarizers described above make them unsuitable for performing such photo-alignment, because use of such polarizers would require that the web be moved too slowly through the photo-alignment system to achieve satisfactory alignment.

Polarizers designed according to various embodiments of the present invention, in contrast, may be used to polarize a high-intensity beam (such as a high-intensity UV beam) over a prolonged period without degradation in performance. The faster the required amount of energy per unit area can be applied to the coating, the faster the web may be moved through the process. As a result, such embodiments may be used to quickly expose each area of the web to light having sufficient energy to properly align the web's coating. As a result, the throughput of the web through the photo-alignment system may be increased, thereby preparing the entire web more quickly and less expensively than with conventional systems.

It is to be understood that although the invention has been described above in terms of particular embodiments, the foregoing embodiments are provided as illustrative only, and do not limit or define the scope of the invention. Various other embodiments, including but not limited to the following, are also within the scope of the claims.

Although particular components are shown and described above for performing particular functions in various embodiments of the present invention, the various elements and components described herein may be further divided into additional components or joined together to form fewer components for performing the same functions.

Although in the description above it is stated that the web is oriented orthogonally to the last set of plates in the pile-of-plates polarizer, this is not strictly a requirement of the present invention. For example, the photo-alignment system could achieve a polarized light exposure having a uniform direction of polarization without orienting the web orthogonally to the pile-of-plates polarizer. For example, a mirror could be inserted between the pile-of-plates polarizer and the web, so that although the web itself would not be orthogonal to the pile-of-plates polarizer, an image of the web would still be orthogonal to the polarizer. In general, optical elements such as mirrors, prisms, and gratings may be used to achieve similar effects, all of which are within the scope of the present invention.

Figure 5A:
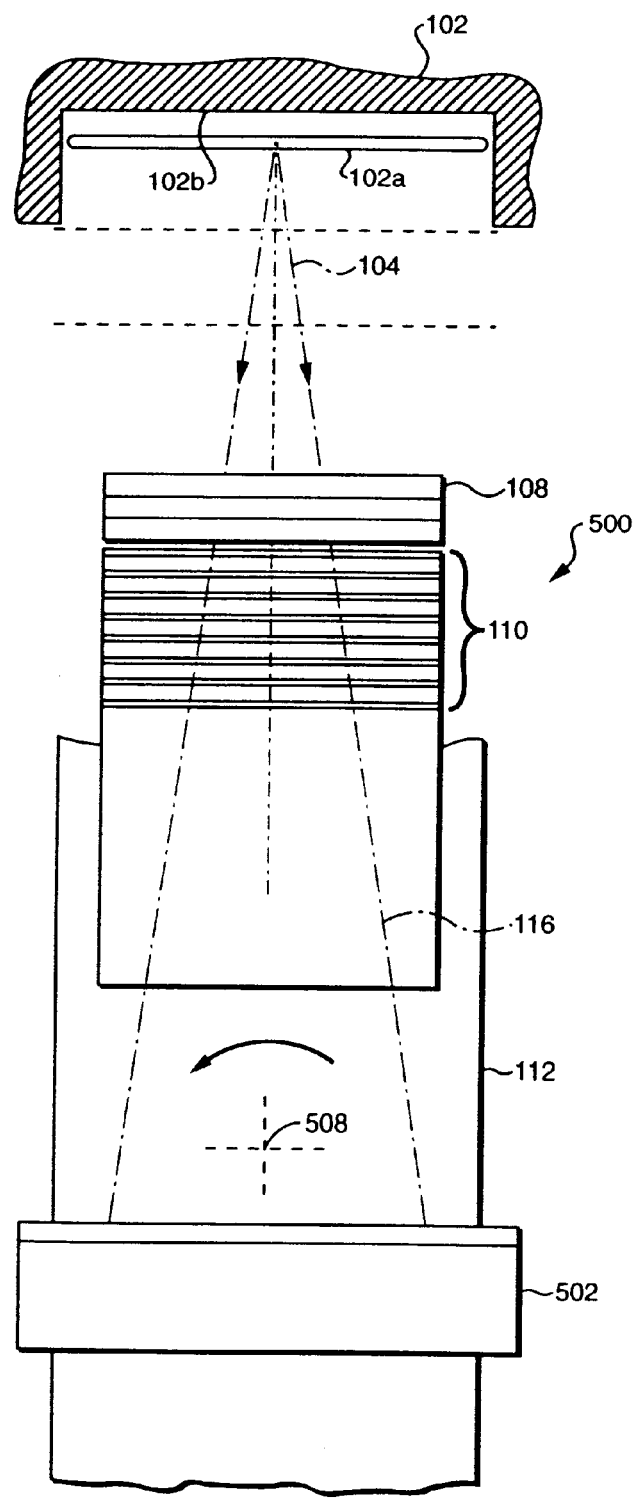
FIG. 5A is a plan view of a down-web photo-alignment system including a mirror according to one embodiment of the present invention.
Figure 5B:
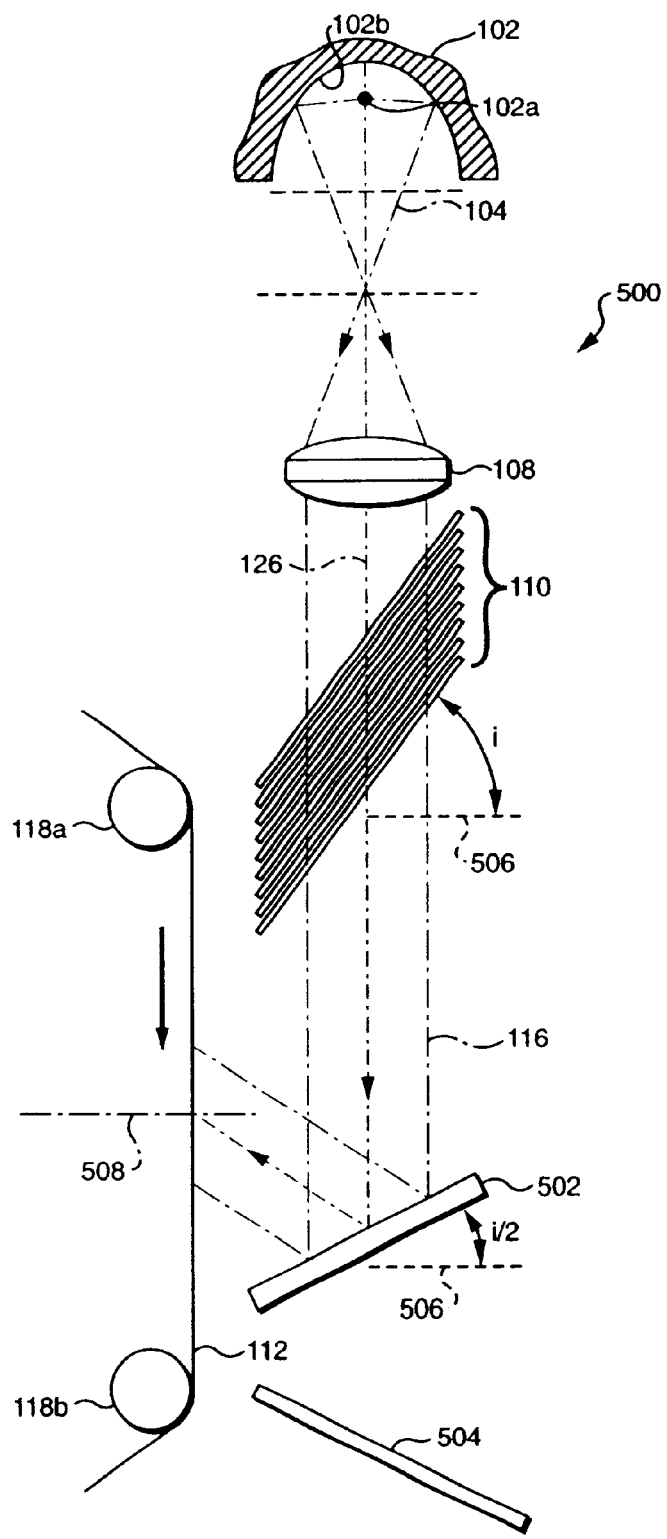
FIG. 5B is a side view of the down-web photo-alignment system of FIG. 5A.

For example, referring to FIG. 5A, a plan view of a system 500 is shown that is similar to the system 100 (FIGS. 1A–1B) except that a mirror 502 has been interposed between the pile-of-plates polarizer 110 and the web 112. Referring to FIG. 5B, a side view of the system 500 is shown in which it is made clear that the mirror 502 is oriented so that an image 504 of the web 112 is orthogonal to the polarizer 110. In particular, if the polarizer 110 is set at an angle i to a normal 506 to an axis of symmetry 126 of the system 500 (which, in the embodiment shown in FIGS. 5A–5B, is collinear with the principal axis of the source light beam 104), and the mirror 502 is set at an angle i/2 to the normal 506, then the image 504 of the web 112 will be orthogonal to the polarizer 110, leading to the desired uniformity of the direction of polarization of the exposure across the web 112.

As with the system 100, the system 500 is particularly suitable for producing down-web exposures with azimuths in the range $-45°<\xi<+45°$ As can be seen from FIG. 5B, addition of the mirror 502 may enable the web 112 to be re-positioned so that the system 500 has a more compact design than the system 100 without the mirror 502. In particular, use of the mirror 502 enables the axis of symmetry 126 of the system 500 to be made parallel to the plane of the web 112. Furthermore, use of the mirror 502 makes it easier and more practical to change the azimuth of the exposure on the manufacturing floor; although a rotation of the optical assembly is still required, such a rotation may be performed only about an axis 508 normal to the web 112, rather than around a cone, as is the case with the non-mirrored systems 100 (FIGS. 1A–1B) and 300 (FIGS. 3A–3B).

Figure 6A:
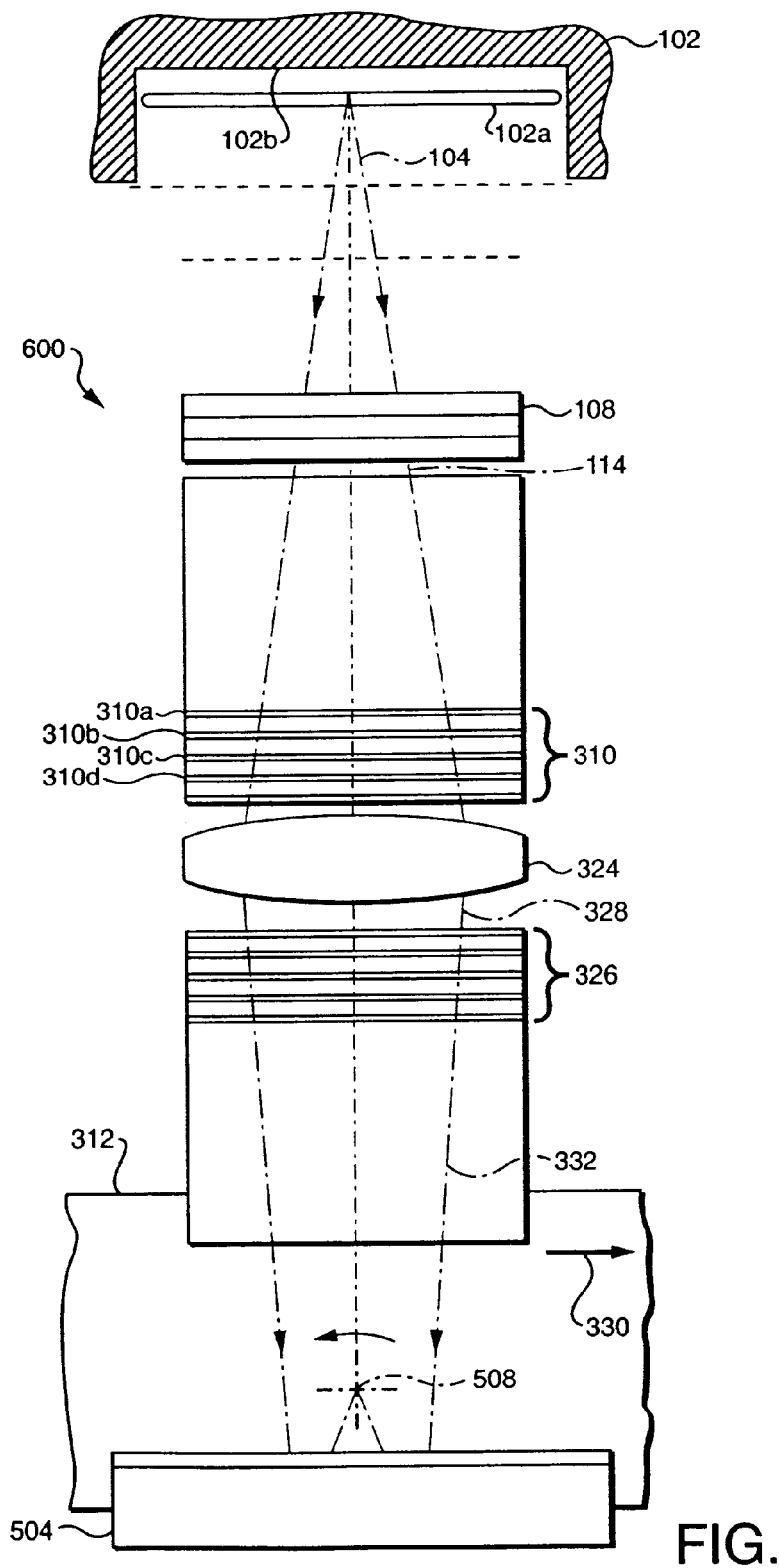
FIG. 6A is a plan view of a cross-web photo-alignment system including a mirror according to one embodiment of the present invention.
Figure 6B:
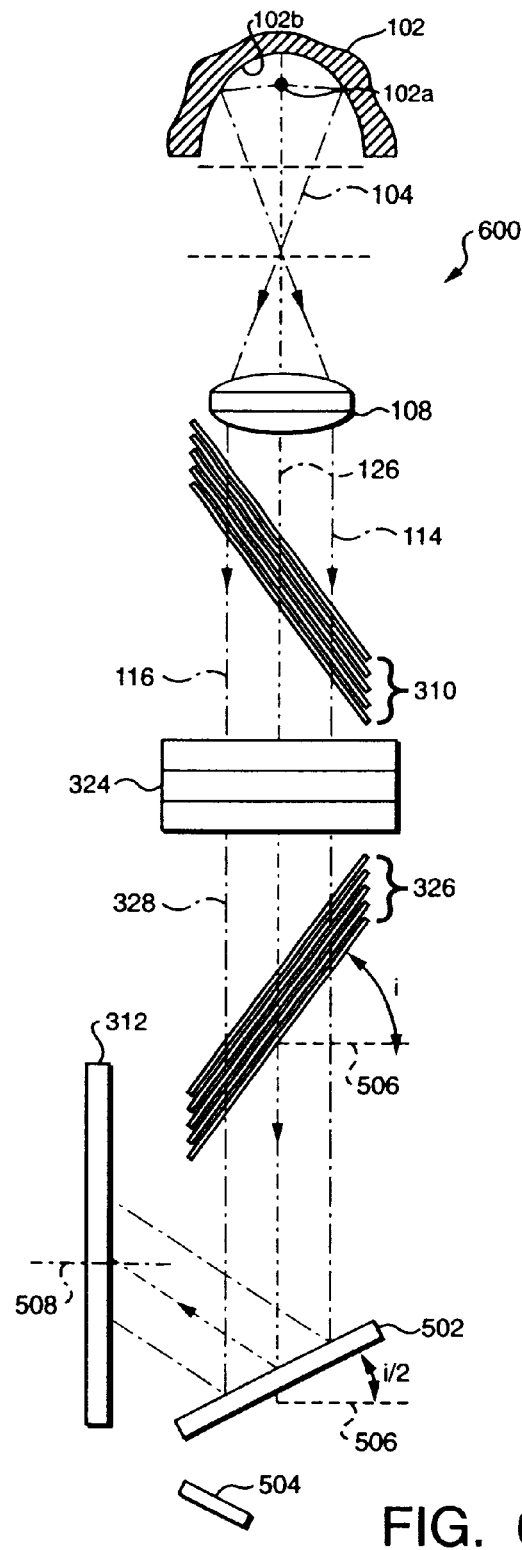
FIG. 6B is a side view of the cross-web photo-alignment system of FIG. 6A.

Referring to FIG. 6A, a plan view of a system 600 is shown that is similar to the system 500 (FIGS. 5A–5B)

except that the system 600 is designed to be optimized for cross-web exposures. FIG. 6B is a side view of the system 600 shown in FIG. 6A. The principles of operation of the system 600 should be apparent from the descriptions above of the systems 100 (FIGS. 1A–1B), 300 (FIGS. 3A–3B), and 500 (FIGS. 5A–5B).

Plates in the pile-of-plates polarizer may be constructed of a variety of materials, such as quartz or fused silica. In general, the plates in the pile-of-plates polarizer should be transparent in the spectrum to be polarized. Furthermore, the plates should be polished to a reasonable degree so that they are not rough and do not scatter light. Generally, plates with higher refractive indices provide better performance.

Although, in the various examples above, all of the plates in the pile-of-plates polarizer are oriented orthogonally to the web, it should be appreciated that this is merely an example and not a limitation of the present invention. Rather, only the final set of plates (which may include one or more plates) immediately preceding the web need be oriented orthogonally to the web to produce light having the desired uniform direction of polarization. Other plates, closer to the light source, serve to improve the polarization contrast by conditioning the beam before it reaches the last set of plates. Such earlier sets of plates therefore need not be orthogonal to the web. Such earlier sets of plates may be oriented at a variety of other angles with respect to the web as may be appropriate for particular applications.

Furthermore, although orthogonal orientation of the web to the last set of plates is described herein as an ideal orientation, it should be appreciated that variations from an exact orthogonal orientation may be used in particular implementations and are still within the scope of the present invention. Although the acceptable amount of variation may vary from application to application, in general, acceptable results may be obtained with a variance of ±5°.

Although the light source is described above as being incident upon the pile-of-plates polarizers at Brewster's angle, it should be appreciated that this is not a requirement of the present invention. Rather, the angle of incidence of the light source upon the pile-of-plates polarizer may be varied to vary the angle of incidence of the light upon the web. In other words, changing the light's angle of incidence upon the pile-of-plates polarizer will also change the light's angle of incidence on the web. Although such variance will also vary the degree to which the light is polarized, a high degree of polarization may not be required in certain applications. Such variance in polarization may be acceptable in particular circumstances in exchange for a more desirable angle of incidence upon the web.

Although the pile-of-plates polarizer is shown and described above as including a plurality of plates, a single plate having an appropriate coating on it could be substituted for the pile-of-plates polarizer, so long as the single plate is oriented orthogonally to the web. In practice, however, such a single-plate polarizer might be prohibitively expensive to use on a large scale. Furthermore, as should be apparent from the system 300 shown in FIGS. 3A–3B, more than one pile-of-plates polarizer may be used within a single system. Each such pile-of-plates polarizer may include any number of plates in any combination of shapes and figurations, so long as the last set of plates is oriented orthogonally to the web.

To improve the polarization contrast, and to simplify the opto-mechanical design of the photo-alignment system, the pile-of-plates polarizer could, for example, be replaced by a smaller number of thin-film coated glass plates. Such plates could also be oriented at or near the Brewster angle to the light produced by the light source. The web should, however, still be oriented in or near the plane orthogonal to the last coated glass plate.

Although the pile-of-plates polarizer is described above as operating in transmission, the plates in the pile-of-plates polarizer may also be used as reflection polarizers. In such an embodiment, the reflected light would be s-polarized, with high contrast, but low efficiency.

Any of a variety of lenses may be used in the embodiments described above to implement the lenses 108 (FIGS. 1A–1B), 208 (FIG. 2), and 324 (FIGS. 3A–3B), although cylindrical lenses are preferred. Such lenses may be made, for example, of UV-grade quartz or fused silica, with power either in the short direction Y, orthogonal to the light source 102, or in the long direction X, parallel to the light source 102. When the light source 102 is a UV light source, all of the optics (e.g., lenses and plates) should be UV-transmissive (e.g., made of quartz or fused silica).

Any of a variety of light sources may be used in accordance with the present invention to implement the light source 102 or the light source 202. For example, suitable light sources include point sources, extended sources, and both collimated and non-collimated sources of light. In one embodiment of the present invention, the VIP 308 lamp from Fusion UV Systems, Inc. of Gaithersberg, Md., having a linear bulb and elliptical reflector is used as an extended light source. In particular, the VIP 308 lamp is a 10" Xenon Chloride excimer lamp, which emits quasi-monochromatic light having a wavelength of 308 nm. Other suitable lamps include, but are not limited to, the Fusion Model 455T-10 and the Fusion Model F600S-10. Both of these lamps use 10" electrodeless bulbs, filled with mercury mixtures, and excited by microwaves. They may also be collated side-by-side to create a source of any length, convenient for scale-up purposes (as shown in FIG. 2 and in FIGS. 4A–4B).

In another embodiment, for example, the light source 102 or the light source 202 may be a Xenon Chloride excimer laser, for example, the Model LPX-220 available from Lambda Physik USA, Inc. of Fort Lauderdale, Fla. To use such a laser to expose a wide web, the narrow laser beam would need to either be expanded or be scanned.

Although various embodiments are described above with respect to polarization of UV light, it should be appreciated that this is not a limitation of the present invention. Rather, various embodiments of the present invention may be used in conjunction with light of various spectra. For example, the techniques described above may be used in conjunction with visible light. As a result, the light source 102 may be a source of visible light, UV light, or other light.

In the description above, it is generally stated that various embodiments of the present invention are of particular use in the industrial-scale manufacture of photo-aligned optical films. It should be appreciated that such polarized light exposures may be useful in a variety of other contexts, and that the present invention is not limited to application in any particular one or ones of such contexts. For example, the techniques described herein may be used to develop an optical compensation film that may be used to coat a liquid crystal display (LCD). Such a film may be used to enable the LCD to be viewed from any angle, unlike conventional LCDS, which may only be viewed from a particular narrow range of angles.

The techniques described herein may also be applied to the preparation of the surface of a liquid crystal cell to prepare the molecules on each of two opposing surfaces of the cell by orienting the molecules at a desired angle. Currently, such "anchoring" of the molecules on the liquid crystal cell's surface is typically performed by using a mechanical rubbing on each of the surfaces to align the molecules properly. The techniques described herein may be used as an alternative to such a mechanical rubbing, whereby the surface molecules may be aligned by exposing them to polarized light, thereby eliminating the need for the mechanical rubbing.

What is claimed is:

1. A system comprising:
   a polarizer comprising at least one polarizing plate, wherein a non-collimated source light beam incident upon the at least one polarizing plate is polarized to develop a polarized light beam; and
   a surface oriented substantially orthogonally to the plane of the at least one polarizing plate and positioned in the optical path of the polarized light beam, whereby the polarized light beam is incident upon the surface to produce a polarized light exposure having a substantially uniform direction of polarization across the surface.

2. The system of claim 1, further comprising a light source to emit the source light beam.

3. The system of claim 2, wherein the light source comprises an extended light source.

4. The system of claim 2, wherein the at least one polarizing plate is oriented at about Brewster's angle to an axis of the light source.

5. The system of claim 1, wherein the source light beam is an ultraviolet light beam.

6. The system of claim 1, wherein the polarizer comprises a pile-of-plates polarizer.

7. The system of claim 6, wherein the at least one polarizing plate comprises a plurality of polarizing plates.

8. The system of claim 7, wherein the plurality of polarizing plates includes a polarizing plate that is closest to the surface, the plane of said polarizing plate closest to the surface being oriented substantially orthogonally to the surface, and wherein at least one of the plurality of polarizing plates that is not closest to the surface is not oriented substantially orthogonally to the surface.

9. The system of claim 7, wherein the at least one polarizing plate comprises a single polarizing plate.

10. The system of claim 1, wherein the at least one polarizing plate comprises at least one transmissive polarizing plate.

11. The system of claim 1, wherein the at least one polarizing plate comprises at least one reflective polarizing plate.

12. The system of claim 1, wherein exposure to the polarized beam aligns molecules on the surface in the direction of the polarized beam's plane of polarization.

13. The system of claim 1, wherein the surface comprises a surface of an optical film having a coating of Linear PhotoPolymerization material.

14. The system of claim 13, wherein the azimuth of the system is defined as the angle between a plane of symmetry of the web, comprising its normal and its direction of travel, and the plane of incidence, comprising the normal to the web and the optical axis of the incident light, and wherein the azimuth is between 0 and 45 degrees.

15. The system of claim 13, wherein the azimuth of the system is defined as the angle between a plane of symmetry of the web, comprising its normal and its direction of travel, and the plane of incidence comprising the normal to the web and the optical axis of the incident light, and wherein the azimuth is between 45 and 90 degrees.

16. The system of claim 1, wherein the surface comprises a surface of a liquid crystal cell.

17. The system of claim 1, further comprising a first lens disposed between the source light beam and the polarizer.

18. The system of claim 1, wherein the surface comprises a virtual surface that is an image formed by an optical element of a real surface.

19. The system of claim 18, wherein the optical element comprises a mirror.

20. The system of claim 18, wherein the surface is parallel to an axis of symmetry of the system.

21. The system of claim 1, wherein the angle between the at least one polarizing plate and a normal to the surface is between −5 and +5 degrees.

22. A system comprising:
   an extended light source to emit a non-collimated source light beam;
   a pile-of-plates polarizer comprising at least one transmissive polarizing plate disposed in an optical path of the source light beam to develop a polarized light beam; and
   a surface oriented substantially orthogonally to the plane of the at least one polarizing plate and positioned in the optical path of the polarized light beam, whereby the polarized light beam is incident upon the surface to produce a polarized light exposure having a substantially uniform direction of polarization across the surface, and wherein exposure to the polarized beam aligns molecules on the surface in the direction of the polarized beam's plane of polarization.

23. The system of claim 22, wherein the at least one polarizing plate is oriented at about Brewster's angle to an axis of the light source.

24. The system of claim 22, wherein the source light beam is an ultraviolet light beam.

25. The system of claim 22, wherein the surface comprises a surface of an optical film having a coating of Linear PhotoPolymerization material.

26. The system of claim 22, wherein the surface comprises a surface of a liquid crystal cell.

27. In a system comprising a polarizer including at least one polarizing plate, a method comprising steps of:
   (A) developing a polarized light beam by providing a non-collimated source light beam to the at least one polarizing plate; and
   (B) positioning a surface in the optical path of the polarized light beam, wherein the surface is oriented substantially orthogonally to the plane of the at least one polarizing plate, and whereby the polarized light beam is incident upon the surface to produce a polarized light exposure having a substantially uniform direction of polarization across the surface.

28. The method of claim 27, wherein the surface comprises a surface of an optical compensation film.

29. The method of claim 27, wherein the surface comprises a surface of a liquid crystal cell.

* * * * *